July 22, 1958 J. C. WHITE ET AL 2,844,532
APPARATUS FOR DETERMINING SPECIFIC GRAVITY OF AN ACID SOLUTION
Filed Oct. 19, 1956
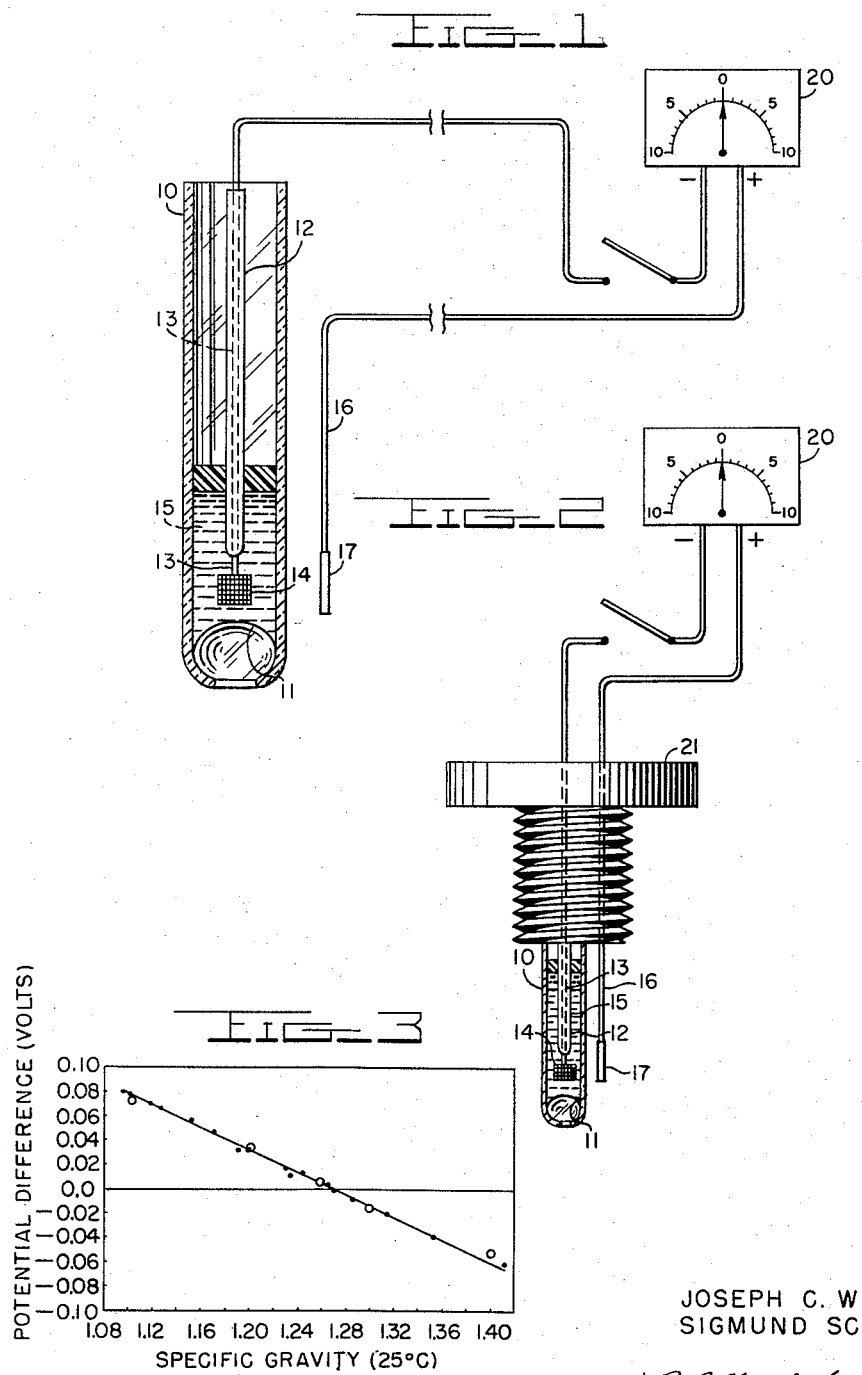
INVENTORS
JOSEPH C. WHITE
SIGMUND SCHULDINER
BY
ATTORNEYS

United States Patent Office 2,844,532
Patented July 22, 1958

1

2,844,532

APPARATUS FOR DETERMINING SPECIFIC GRAVITY OF AN ACID SOLUTION

Joseph C. White, Hyattsville, Md., and Sigmund Schuldiner, Washington, D. C., assignors to the United States of America as represented by the Secretary of the Navy Application October 19, 1956, Serial No. 617,207

1 Claim. (Cl. 204—195)

(Granted under Title 35, U. S. Code (1952), sec. 266)

The invention described herein may be manufactured and used by or for the Government of the United States of America for governmental purposes without the payment of any royalties thereon or therefor.

The present invention relates to a method and apparatus for determining the specific gravity of an acid solution and more particularly to a device for remotely indicating the specific gravity of the acid solution of the electrolyte of a storage battery.

To obtain efficient operation of a lead-acid storage battery, it is necessary to know the state of charge of the cells composing the battery. This may be accomplished by various internal and external methods. One of the most common methods is to use a hydrometer. The hydrometer is satisfactory for most uses of batteries where only a close estimation of the specific gravity is good enough and access to the batteries is not limited. The hydrometer falls short of being an adequate indicator, the acid gets spilled, the float is subject to sticking, and the readings are difficult. Where the batteries are in a compartment, such as in a submarine, it requires frequent visits by the attendant personnel which is difficult and dangerous especially during charging when the gases escape from the cells of the batteries. Remote indicators have been used but require alteration of the battery which affects the battery operation, they are bulky, and for use on moving objects such as submarines the movement of the ship affects their accuracy.

It is accordingly an object of the present invention to provide a device for remotely determining the specific gravity of a storage battery electrolyte.

Another object is to provide a small, rugged, inexpensive device independent of the tilt of a battery for remotely determining the specific gravity of a storage battery electrolyte.

Yet another object is to provide a device for remote indication of the specific gravity of a storage battery and adapted for use with the battery without materially changing the structure.

Still another object is to provide a new and novel device for determining the specific gravity of an acid solution.

Obviously further objects of the present invention will be apparent from a more detailed description of the preferred embodiments of the invention shown in the accompanying drawings in which:

Fig. 1 illustrates a side elevational view through the center of one embodiment of the device of this invention, Fig. 2 illustrates a side elevational view through the center of the device of Fig. 1 secured to the screw cap of a battery cell, and Fig. 3 is a graph which illustrates the relationship between potential difference of concentration cell and specific gravity of sulfuric acid solutions.

In accordance with the present invention, apparatus is provided for remote indication for determining the specific gravity of a solution such as a storage battery electrolyte. The invention consists of the application of an electrode assembly which measures the change in concentration of the electrolyte in a storage battery wherein the concentration of the electrolyte is a function of the charge capacity of the battery. The determination of the concentration is based on the potential difference of a pair of lead dioxide coated platinum electrodes separated by a glass membrane of a glass electrode, each being in contact with separate electrolyte solutions. The glass electrode including the membrane has an electrolyte of a known concentration and a lead dioxide coated platinum gauge electrode therein whereas the counter electrode is in the form of a lead dioxide coated platinum wire positioned for convenience along and near the outside of the glass electrode. The glass electrode and the counter electrode are suspended in the electrolyte which is to be compared or measured. The two platinum wires are brought out as leads and connected to a very high impedance millivoltmeter (from 1,000 to 5,000 megohms) to measure the difference in potential of the known and unknown concentration of the electrolytes. By using an electrolyte for the glass electrode of the specific gravity desired for the test solution, the potential difference will be zero when the concentration or specific gravity of the electrolytes are equal thereby indicating the desired specific gravity for the tested electrolyte. Since the electrodes are of the same metal and are suspended into the electrolyte that is being tested, temperature variations will not have any effect on measuring the potential difference because the acid solution in the glass electrode will maintain the same temperature as the tested solution which surrounds the glass electrode and the temperature coefficient of the electrode is the same.

More particularly the device of the present invention includes principally an electronic potentiometer and a measuring glass electrode system. The glass electrode may be of various well known types having an insulation coated glass tube 10 to which a glass membrane 11 has been sealed on the end. The glass membrane is of inverted bulbular form and sufficiently thin so that an electrical potential may develop through the glass. Electrical connection is made with the inside of the glass membrane through means of a half-cell arrangement which consists of a glass insulator 12 about a platinum wire 13 which has a lead dioxide coated platinum gauze 14 on the end thereof extending below the glass insulator and suspended in a solution of electrolyte 15 sealed within the glass electrode. The electrolyte has a known acid concentration and specific gravity. The other end of the wire is brought out from the glass electrode as a lead which is connected to the negative terminal of a high impedance meter 20. A counter electrode includes a platinum wire 16 as shown in Fig. 1 which has a lead dioxide coated end 17 positioned near the surface of the outside of the glass electrode. The other end of wire 16 is brought out as a lead to the positive side of the meter to complete the electrical circuit.

In operation of the device, the glass electrode with a known electrolyte sealed therein and with the wire 16 on the outside is suspended in an electrolyte in which the specific gravity is to be determined and the reading on the meter is noted. The meter reading will indicate the potential difference between the two lead dioxide coated electrodes 14 and 16 which is a function of the specific gravity of the measured electrolyte. The specific gravity is then determined by a graph which relates the potential difference reading to known specific gravity readings.

In a more specific example wherein the device is used for measuring the specific gravity of the electrolyte in a storage battery the glass electrode and counter electrode may be connected to the bottom of the cap 21 of a battery cell, as shown in Fig. 2 and suspended into the acid solution of the cell as the cap is screwed into position. An acid concentration of about 1.260 specific gravity is sealed in the glass electrode before the glass electrode is sealed to the cap and suspended in the electrolyte of the battery. The reading of the millivoltmeter indicates the potential difference between the two lead dioxide coated platinum electrodes which is a function of the acid concentration of the electrolyte of the battery and represents indirectly the specific gravity of the electrolyte. For those batteries which do not have a screw cap, the electrodes may be secured to any structure of a battery which does not interfere with the operation thereof and yet be suspended into the electrolyte. It is possible, if desired to make a positive plate of the battery the counter electrode and only suspend the glass electrode into the electrolyte.

The greater the potential difference reading, the greater the specific gravity difference between the known and unknown solutions. A positive reading on the meter indicates the specific gravity of the tested solution to be less than the reference solution in the glass electrode and a negative indication represents a higher specific gravity in the tested solution than in the reference solution. Hence, by knowing the relationship between acid concentration and the potential difference readings shown by the millivoltmeter, the specific gravity of the measured electrolyte can be determined. Such a relationship is illustrated in Fig. 3 and the data is obtained from testing known acid solutions of different specific gravity.

The graph of Fig. 3 shows a record of specific gravity vs. potential difference (volts) which illustrates the relationship between the potential difference of a half-cell containing a known acid concentration and the specific gravity of different known sulfuric acid solutions. (Specific gravity of the acid inside of the glass electrode was 1.260 at 25 degrees centigrade.) The graph values are obtained by suspending the device of Fig. 1 as described above into a multiple number of known acid concentrations having a different known specific gravity and then recording the potential difference on the graph for the various concentrations. As shown by the graph there is a linear relationship between the potential difference and the acid concentrations of different specific gravity. When taking a measure of the acid concentration specific gravity as in the battery above, the meter reading is noted and the related corresponding specific gravity value shown by the graph represents the specific gravity of the electrolyte in the battery. Once having calibrated the device to determine the relative potentials for different solutions, it would be obvious to indicate the corresponding specific gravity values on the millivoltmeter in order to obtain the specific gravity readings directly from the meter.

In using the device for remote indication of the specific gravity of a battery such as in a submarine, the device of Fig. 2 is submerged in the battery acid solution with an acid solution of the desired specific gravity in the glass electrode such that a remotely positioned reading of zero indicates a fully charged battery. As the battery discharges, the meter reading becomes more positive and is watched until the potential difference becomes great enough to indicate that the battery is too weak to be of value, then the battery should be recharged. The meter can be provided with markings such as fully charged, half charged, etc., to indicate the state of the battery as the meter indicates the potential difference of the acid solutions.

Devices such as shown in Fig. 2 can be used with any number of battery cells wherein each device is connected with a bank of switches that connect with a remote indicator such that any one of the batteries may be checked when desired without having to go near the battery.

The electrodes of the device could be suspended into a battery and connected with a control device in a circuit in order to start a generator to recharge the battery after it has been discharged a certain amount. Further use could be obtained in controlling the rate at which the battery could be charged.

Obviously many modification and variations of the present invention are possible in the light of the above teaching. It is therefore to be understood, that within the scope of the appended claim the invention may be practiced otherwise than as specifically described.

What is claimed is:

A system for remotely determining the specific gravity of an acid solution of a storage battery which comprises a glass electrode assembly and a counter electrode adapted to be positioned within a battery and suspended within an acid solution within said battery, said glass electrode assembly comprising a glass tube having a glass membrane on the end thereof, an acid of known specific gravity within said tube, a glass insulated platinum wire within said glass tube, said platinum wire having a lead dioxide coated end extending beyond said glass insulation and suspended in the acid within said tube and positioned adjacent said glass membrane, said counter electrode comprising a lead dioxide coated platinum wire positioned adjacent to said electrode assembly, and a high impedance voltmeter connected to said glass insulated platinum wire within said tube and to said counter electrode positioned adjacent to said electrode assembly to measure any potential difference between said electrodes.

References Cited in the file of this patent

UNITED STATES PATENTS

| | | |
|---|---|---|
| 1,373,951 | Cox et al. | Apr. 5, 1921 |
| 1,657,421 | Trenel | Jan. 24, 1928 |
| 2,769,072 | Obenshain | Oct. 30, 1956 |

OTHER REFERENCES

Lengyel et al.: Trans. Faraday Soc. of London, vol. 30, 1934, pp. 461–464.